United States Patent Office 2,978,697
Patented Apr. 4, 1961

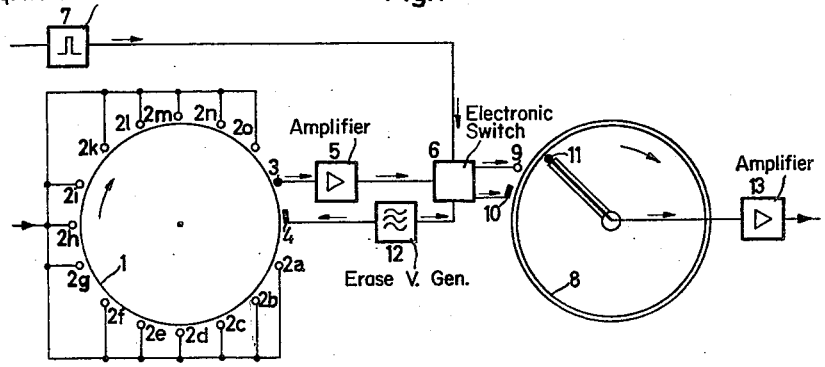
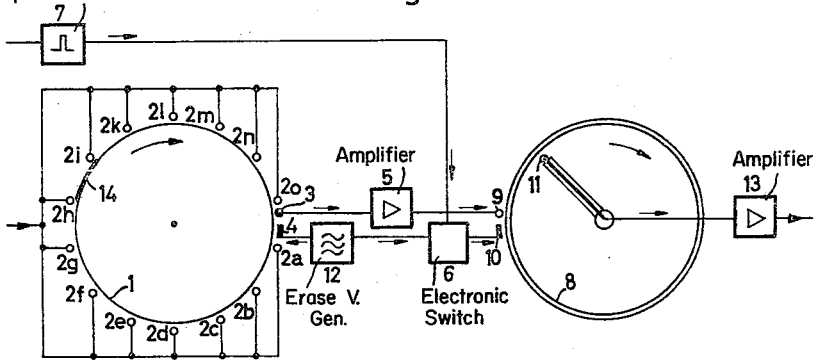
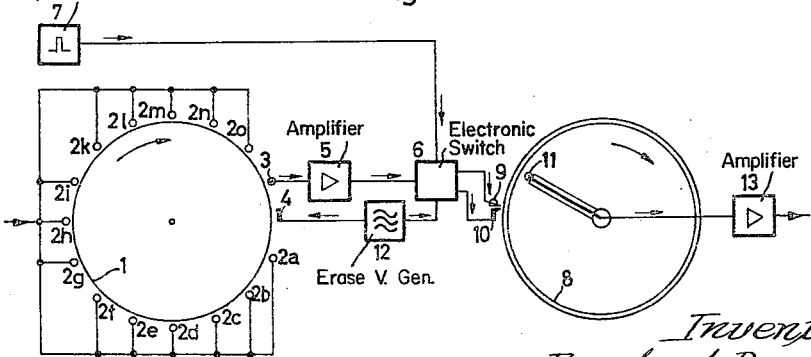
Inventors.
Bernhard Donath, &
Hans-Joachim Zetzmann.

2,978,697

APPARATUS FOR REDUCING THE FREQUENCY BAND WIDTH OF RADAR FREQUENCY MIXTURES AND THE LIKE

Bernhard Donath, Munich, and Hans-Joachim Zetzmann, Wessling, Upper Bavaria, Germany, assignors to Siemens & Halske Aktiengesellschaft, Munich and Berlin, Germany, a corporation of Germany Filed Aug. 15, 1955, Ser. No. 528,162

Claims priority, application Germany Aug. 13, 1954

7 Claims. (Cl. 343—5)

This invention is concerned with apparatus for reducing the frequency band width of video signals produced, for example, in the case of radar or panorama apparatus, by periodic scanning of objects by means of high-frequency impulses. The invention is important in the case of radar devices particularly when it is desired to provide for a narrow band wire or wireless transmission of radar screen pictures.

Several suggestions have been made for reducing the frequency band width of such signals. For example, it has been proposed to extract from the sequence of reflected impulses received by a radar device, at predetermined times, individual impulses and to combine such impulses with other reflected impulses extracted similarly at different times, thereby obtaining a picture which is as it were stroboscopically expanded. This proposal which is known as "sampling" entails loss of a majority of reflection impulses and therefore causes disadvantages.

Another proposal provides for accumulation of the reflection impulses by means of a storing device, the impulses being fed into the storing device at high speed and being extracted therefrom at a lower speed. The storage effect of a phosphorescent material is used for this purpose, for example, the screen of a cathode ray tube or a picture storing tube. A perfect addition of the reflected impulses, is, however, impossible due to the unavoidable periodic fading of the excitation in the intervals between the reflected impulses. A further considerable disadvantage results from the fact that saturation of the storage material occurs very quickly, making complete summation of all reflected impulses allotted to a given reflected point impossible. In addition, the constructional forms that have become known for realizing these proposals are complicated and expensive.

The present invention provides means for avoiding the above noted drawbacks.

In accordance with the invention, in a system for reducing the frequency band width of a video signal produced by periodic scanning of objects by means of high-frequency impulses, especially a radar signal or the like, the reflected impulses of a reflecting point occurring within a scanning time interval determined by the width of the antenna radiation pattern of maximum field strength and the time of rotation of the antenna, are linearly added with avoidance, jointly or individually, of damping effects occurring as a function of time, for example, fading effects and avoidance of distortions and overlapping.

This object of the invention is particularly advantageously realized by recording, that is, storing and adding the reflected impulses of one and the same reflecting point, of a scanning time interval, upon a rotating magnetic material or carrier and by taking off the reflected impulse totals with a speed that is reduced as compared with the recording speed.

In accordance with another object and feature, the invention provides, for the recording of the reflected impulses upon a rotating magnetic carrier, a plurality of recording heads which are electrically connected in parallel. The number of recording heads may correspond to the number of high-frequency impulses transmitted within a scanning time interval or to a number which is an integral part thereof. The speed of rotation of the magnetic storage device is advantageously fixed in a predetermined relationship to the frequency sequence of the radiated high-frequency impulses. It is, for example, of advantage to provide for a time of revolution of the magnetic carrier corresponding to the scanning time interval or to an interval which is an integral part thereof. The recording heads are thereby arranged in a spacing such that the reflected impulses reflected by the same point are added. It is possible to provide for operation of all recording heads relative to the same track of the magnetic carrier or, primarily so as to avoid overlapping of recorded impulses, relative to respectively different tracks.

In accordance with a further object and feature of the invention, there is provided a switch, preferably an electronic switch, for connecting one or more electrically parallel recording heads for the last impulse interval only of each scanning time interval or for the last impulse interval of each integral part of the scanning time interval.

The extraction or taking off of the reflected impulses which are expanded as to time may be carried out, for example, by recording the added reflected impulses without gaps and in true sequence upon a second rotating magnetic carrier, and taking off these impulses at a speed which is, as compared with the recording speed of the primary reflected impulses, slower by a factor which corresponds to the number of impulses occurring within a scanning time interval or an integral part thereof.

The foregoing and further objects and features of the invention will appear from the following description with reference to the accompanying diagrammatic drawing. In this drawing:

Fig. 1 shows an embodiment of the invention;
Fig. 2 illustrates a modification; and
Fig. 3 indicates another modification.

There is assumed a radar or panorama apparatus having an antenna which has a radiation pattern of maximum field strength with a divergence angle of 2° and a speed of rotation of about 12 r.p.m. With an impulse sequence frequency of 1000 cycles, there will be transmitted 5000 impulses incident to each revolution of the antenna. Accordingly, to each scanning time interval which is determined by the antenna divergence angle of 2° and the speed of rotation of 12 r.p.m., there will be allotted 28 impulses, that is, each reflecting point will be scanned 28 times. By adding the 28 impulse sectors belonging to one scanning time interval, and again scanning the resulting sum within a 28-fold time, there will result a reduction of the frequency band width of the picture frequency mixture on the order of 28 : 1. For the sake of accuracy of indication, it will be assumed that the reduction of the frequency band width is in the example to be now described only on the order of 14 : 1.

Referring now to Fig. 1, numeral 1 indicates a circularly extending magnetic carrier forming a storage device upon which the reflected impulses are to be recorded. The magnetic carrier which may be in the form of a wire, foil or tape or disk, depending on given constructional requirements, is rotated by suitable and known means omitted from the drawing. Associated with and coacting with this magnetic storage device are fourteen recording heads 2a to 2o, which are equally spaced circumferentially thereof and connected in parallel. In addition, there is provided a reproduce or pickup head 3 and an erase head 4, which are spaced from each other and from the respectively adjacent recording heads in accordance with the spacing of the latter.

The purpose of the magnetic storage device 1 is to record the reflected impulses coming from the radar apparatus. The recording heads may be arranged so that they are disposed in the same plane with respect to the storage device and accordingly operating relative to the identical track thereof. It is, however, also possible, especially for avoiding overlapping of recordings, to laterally offset the recording heads while retaining the angular spacing thereof, so that they operate relative to different recording tracks of the magnetic carrier.

If the recording heads are disposed in a common plane, only one pickup head 3 and one erase head 4 will be provided and disposed in the same plane. However, if the recording heads are offset laterally of the magnetic carrier so as to operate along respectively different tracks, there may be provided a pickup head and an erase head for each track, with the corresponding pickup and erase heads respectively connected in parallel, or one wide pickup head and a correspondingly wide erase head respectively extending across all parallel tracks.

The operation incident to the storing and adding of the reflected impulses is as follows:

The magnetic carrier or storage device 1 rotates with a speed such that any given point of the magnetic material moves in 1 millisecond a distance corresponding exactly to the spacing between the individual recording heads. The erase head 4 is continuously effective and, accordingly, the magnetic material moving past the recording head 2a will always be free of reflected impulses. Reflected impulses arriving at the radar apparatus are recorded simultaneously by all the recording heads 2a–2o. The next incoming reflected impulses are similarly recorded in the storage device; but at this time the magnetic carrier has been rotated by an amount corresponding to the spacing of two recording heads, and all but the recording head 2a will accordingly effect recording for a second time. This operation continues until the magnetic carrier has rotated to a point that, upon the 14th sequence of reflected impulses, the recording head 2o effects recording for the 14th time. At the conclusion of this 14th recording there will be, at the pickup head 3 the sum of 14 superposed recorded sequential reflected impulses which are taken off by the pickup head 3 and conducted to the amplifier 5. This operation continues and 14 magnetic sequences of reflected impulses are accordingly presented to the pickup head 3 and thereby taken off. Of these sequential reflected impulses, only the fourteenth is transmitted. This segregation or selection of the 14th of the sequential reflected impulses is effected by the electronic switch 6 in conjunction with the square wave generator 7.

As mentioned before, it may be desirable to record upon different tracks with the use of correspondingly laterally offset recording heads. The summation of the reflected impulses is thereby effected in the magnetic carrier and also incident to the pickup operation.

The recorded sequential reflected impulse totals obtained at the pickup head, following amplification by the amplifier 5 are conducted to the electronic switch 6 which is controlled by a scanning voltage from the square wave generator 7. This switch 6 operates so as to transmit only each fourteenth sequence of reflected impulses taken off by the pickup head. Accordingly, a selection or segregation is effected without incurring any loss of signals as in previously known systems.

The selected totals of reflected impulses are thereupon conducted to a second storage system 8 likewise comprising a rotating carrier of magnetic material, the purpose of which is to receive the selected sequences of reflected impulses and to assemble them without gaps. The storage system 8, for this purpose, is provided with a recording head 9 and an erase head 10, both of which are stationary, and with a movable pickup head 11 which rotates in the same direction of rotation as the storage system but at a somewhat different speed. The speed of rotation of the storage system 8 so differs from that of the storage device 1 that after recording of a sequence of reflected impulses by the recording head 9, the storage device 8 is advanced more or less by such amount that the next successive sequence of reflected impulses will follow without a gap.

Thus, by the provision of suitable geometric dimensions and r.p.m. of the storage device 8, it is possible to accommodate successively upon the storage device 8 fourteen selected sequences or series of reflected impulses. During the storing of the fifteenth sequence or series of reflected impulses, the very first series is, however, cancelled by the erase head 10. This erase head is excited from the erase voltage generator 12 by way of the electronic switch 6, because there must be a phaseal and synchronous relationship between the storing in the storage device 1 and the erasing in the storage device 8. This is obtained by always cancelling the earliest of the successively occurring series of reflected impulses and recording in its place prior to the next revolution the series last to arrive. The storage device 8 accordingly always receives the last 14, in each complete cycle of reflected impulse series.

The series of reflected impulses which are successively recorded in the storage device 8 with omission of gaps, are taken off by the rotating pickup head 11 at such speed, that each individual series which corresponds to the time of one impulse interval (in the present case 1 millisecond) is respectively expanded to the scanning time determined by the divergence angle of the radiation pattern and the r.p.m. of the antenna or to an integral part thereof (in the present example 1 : 2). The expansion factor (in the present example 14) thus corresponds to the reduction of the frequency band width. Accordingly, the reflected impulses will, in the present example, appear at the output of the storage apparatus and therewith at the input of the amplifier 13, with a frequency band width reduced by 14 : 1.

In the described example, the speed of rotation of the pickup head 11, rotating in the same direction as the storage device 8, is such that it amounts substantially to $13/14$ of the speed of rotation of the corresponding storage device. The constructional form of the storage device thus may be such that the track which is to be magnetized is, for example, disposed upon the outside rim of the cylindrical carrier body and is acted upon by the recording head 9, while the pickup head 11 rotates along the inside of the carrier body.

Modifications are, however, possible.

For example, the storage device 8 may be made in the form of a flat disk, with the recording head 9 and the erase head 10 disposed on one side and the pickup head 11 on the other side thereof.

It may be desirable in some circumstances to eliminate the use of a special synchronized square wave generator for the synchronization of the pickup operation of the storage device 1. An example of an embodiment of this kind is illustrated in Fig. 2 in which switching elements corresponding to those shown in Fig. 1 are similarly referenced. The rotating magnetic storage device 1 is in this case coated with magnetic material only throughout a circumferential sector 14 extending for a distance corresponding to the spacing between two recording heads. The storage operations correspond to those described before except for the difference that the segregating or selecting is not effected by the electronic switch 6 in conjunction with the square wave generator 7, but by the motion of the storage segment relative to the pickup head 3.

A further advantageous modification proposes to reduce practically to zero the spacing between the recording head 9 and the erase head 10 of the second storage device shown in Fig. 1, thereby making the sector that is to be erased in each instant as small as possible.

An embodiment in which such feature is incorporated is indicated in Fig. 3 wherein parts similar to those of Figs. 1 and 2 are similarly referenced. This feature provides the advantage, in video transmission of radar devices, of producing in the remote secondary apparatus all superposed sector pictures without omissions resulting from erased and therefore dead sections.

Known and suitable means may be provided throughout to realize the intents and purposes of the invention as described herein and as expressed in the appended claims which define what is believed to be new and desired to have protected by Letters Patent of the United States.

We claim:

1. Apparatus for reducing the frequency band width of a radar screen picture frequency mixture produced by periodic radar scanning of objects by high-frequency impulses comprising a first movable magnetic carrier, a plurality of fixed record heads arranged mutually identically spaced for coaction with said first carrier, a pickup head and an erase head for coaction with said first carrier, circuit means for simultaneously conducting radar reflection impulses to all said record heads while said first magnetic carrier is moving whereby said reflection impulses are additively recorded upon said first carrier, a second movable magnetic carrier and a record head and an erase head coacting therewith, means for interconnecting the pickup head coacting with said first magnetic carrier with the record head coacting with said second carrier to record reflected impulses upon said second carrier which had been recorded upon said first carrier, and a movable pickup head coacting with said second magnetic carrier for taking off reflected impulses recorded thereon at a speed which is lower than the speed at which said impulses are recorded.

2. Apparatus according to claim 1, wherein said first magnetic carrier comprises magnetizable material spanning the entire distance between said record heads coacting therewith.

3. Apparatus according to claim 2, comprising selecting means interconnected with the pickup head coacting with said first carrier and the record head coacting with said second carrier for selecting reflection impulses to be recorded upon said second carrier.

4. Apparatus according to claim 1, wherein said first magnetic carrier comprises magnetizable material of a length corresponding to the spacing between any two of the record heads coacting therewith.

5. Apparatus according to claim 1, wherein the spacing between the pickup and erase heads coacting with said first magnetic carrier exceeds the spacing between the record and erase heads coacting with said second magnetic carrier.

6. Apparatus according to claim 1, comprising a common source for actuating said erase heads.

7. Apparatus according to claim 1, wherein said first and second magnetic carriers move at different speeds and wherein said pickup head coacting with said second magnetic carrier moves at a speed lower than either of said carriers.

References Cited in the file of this patent

UNITED STATES PATENTS

| | | |
|---|---|---|
| 1,671,143 | Campbell | May 29, 1928 |
| 1,671,151 | French et al. | May 29, 1928 |
| 2,566,189 | Gloess | Aug. 28, 1951 |
| 2,617,094 | Tinus | Nov. 4, 1952 |
| 2,619,636 | Veaux | Nov. 25, 1952 |
| 2,836,359 | Mazzagatti | May 27, 1958 |